United States Patent
Xu et al.

(10) Patent No.: US 12,260,608 B2
(45) Date of Patent: Mar. 25, 2025

(54) IMAGE CAPTURING METHOD AND DEVICE, APPARATUS, AND STORAGE MEDIUM

(71) Applicant: ZHEJIANG UNIVIEW TECHNOLOGIES CO., LTD., Zhejiang (CN)

(72) Inventors: Qiong Xu, Zhejiang (CN); Wenping Zhang, Zhejiang (CN)

(73) Assignee: ZHEJIANG UNIVIEW TECHNOLOGIES CO., LTD., Zhejiang (CN)

(*) Notice: Subject to any disclaimer, the term of this patent is extended or adjusted under 35 U.S.C. 154(b) by 265 days.

(21) Appl. No.: 17/782,521

(22) PCT Filed: Apr. 14, 2020

(86) PCT No.: PCT/CN2020/084589
§ 371 (c)(1),
(2) Date: Jun. 3, 2022

(87) PCT Pub. No.: WO2021/109409
PCT Pub. Date: Jun. 10, 2021

(65) Prior Publication Data
US 2023/0005239 A1    Jan. 5, 2023

(30) Foreign Application Priority Data
Dec. 3, 2019 (CN) .......................... 201911222644.4

(51) Int. Cl.
*G06V 10/60* (2022.01)
*G06T 7/20* (2017.01)
(Continued)

(52) U.S. Cl.
CPC ............. *G06V 10/60* (2022.01); *G06T 7/20* (2013.01); *G06T 7/70* (2017.01); *G06V 10/25* (2022.01);
(Continued)

(58) Field of Classification Search
CPC ...... G06V 10/60; G06V 10/25; G06V 10/761; G06V 40/169; G06V 2201/07; G06T 7/20;
(Continued)

(56) References Cited

U.S. PATENT DOCUMENTS

| | | | |
|---|---|---|---|
| 2010/0141826 A1 | 6/2010 | Thorn | |
| 2015/0029357 A1* | 1/2015 | Hamalainen | H04N 23/62 348/223.1 |

(Continued)

FOREIGN PATENT DOCUMENTS

| | | |
|---|---|---|
| CN | 1929561 A | 3/2007 |
| CN | 101247479 A | 8/2008 |

(Continued)

OTHER PUBLICATIONS

Google Patent English Translation of CN103369227A. (Year: 2013).*
(Continued)

*Primary Examiner* — Phuoc Tran
(74) *Attorney, Agent, or Firm* — Morgan, Lewis & Bockius LLP

(57) ABSTRACT

Provided are an image capturing method and apparatus, a device and a storage medium. The method includes: at a new acquisition moment, predicting a predicted projection area position of a target object in a current captured image on an
(Continued)

image sensor and estimated exposure brightness information of the target object in the predicted projection area position; adjusting, according to a type of the target object and the estimated exposure brightness information, an exposure parameter of the target object in the predicted projection area position when the new acquisition moment arrives; and acquiring a new captured image at the new acquisition moment according to the adjusted exposure parameter, where both the new captured image and the current captured image include the target object.

15 Claims, 6 Drawing Sheets

(51) Int. Cl.
    *G06T 7/70*     (2017.01)
    *G06V 10/25*     (2022.01)
    *G06V 10/74*     (2022.01)
    *G06V 40/16*     (2022.01)

(52) U.S. Cl.
    CPC .......... *G06V 10/761* (2022.01); *G06V 40/169* (2022.01); *G06T 2207/10144* (2013.01); *G06T 2207/30168* (2013.01); *G06V 2201/07* (2022.01)

(58) Field of Classification Search
    CPC . G06T 7/70; G06T 2207/10144; H04N 23/71; H04N 23/72; H04N 23/73; H04N 23/667; H04N 23/611; H04N 23/70
    See application file for complete search history.

(56) References Cited

U.S. PATENT DOCUMENTS

| | | | |
|---|---|---|---|
| 2016/0140391 A1* | 5/2016 | Kim | G06T 7/20 |
| | | | 382/103 |
| 2020/0396367 A1* | 12/2020 | Segapelli | H04N 23/61 |

FOREIGN PATENT DOCUMENTS

| | | |
|---|---|---|
| CN | 103369227 A | 10/2013 |
| CN | 103376616 A | 10/2013 |
| CN | 105407276 A | 3/2016 |
| CN | 107071290 A | 8/2017 |
| CN | 109547701 A | 3/2019 |
| CN | 109922275 A | 6/2019 |
| CN | 110099222 A | 8/2019 |
| JP | 2009157085 A | 7/2009 |

OTHER PUBLICATIONS

International Search Report for Application No. PCT/CN2020/084589, dated Sep. 3, 2020, 4 pages including English translation.

* cited by examiner

IMAGE CAPTURING METHOD AND DEVICE, APPARATUS, AND STORAGE MEDIUM

CROSS-REFERENCE TO RELATED APPLICATIONS

This is a national stage application filed under 37 U.S.C. 371 based on International Patent Application No. PCT/CN2020/084589, filed on Apr. 14, 2020, which claims priority to Chinese Patent Application No. 201911222644.4 filed with the China National Intellectual Property Administration (CNIPA) on Dec. 3, 2019, the disclosure of which is incorporated herein by reference in its entirety.

TECHNICAL FIELD

The present application relates to the field of monitoring technology, for example, an image capturing method and apparatus, a device and a storage medium.

BACKGROUND

With the development of monitoring technology, video surveillance applications have an increasing demand for acquisition and recognition of captured targets such as a human face, a human body and a license plate.

However, in an actual scenario, if an acquired image includes multiple target objects such as the human face, the human body and the license plate, it cannot be ensured that different target objects meet capture requirements at the same time. That is, generally only one of the target objects can be guaranteed to achieve a required capture effect, and it cannot be ensured that all the multiple target objects achieve required capture effects.

SUMMARY

Embodiments of the present application provide an image capturing method and apparatus, a device and a storage medium, so as to ensure that multiple target objects can all achieve desired capturing effects in a capturing process.

Embodiments of the present application provide an image capturing method including the steps below.

A predicted projection area position of a target object in a current captured image on an image sensor and at a new acquisition moment is predicted, and estimated exposure brightness information of the target object in the predicted projection area position and at the new acquisition moment is predicted.

An exposure parameter of the target object in the predicted projection area position is adjusted according to a type of the target object and the estimated exposure brightness information when the new acquisition moment arrives.

A new captured image is acquired at the new acquisition moment according to the adjusted exposure parameter, where both the new captured image and the current captured image include the target object.

Embodiments of the present application further provide an image capturing apparatus including an exposure brightness determination module, an exposure parameter adjustment module and an image exposure capture module.

The exposure brightness determination module is configured to predict a predicted projection area position of a target object in a current captured image on an image sensor and at a new acquisition moment and predict estimated exposure brightness information of the target object in the predicted projection area position and at the new acquisition moment.

The exposure parameter adjustment module is configured to adjust, according to a type of the target object and the estimated exposure brightness information, an exposure parameter of the target object in the predicted projection area position when the new acquisition moment arrives.

The image exposure capture module is configured to acquire a new captured image at the new acquisition moment according to the adjusted exposure parameter, where both the new captured image and the current captured image include the target object.

Embodiment of the present application further provides an electronic device including one or more processors and a storage apparatus.

The storage apparatus is configured to store one or more programs.

The one or more programs are executed by the one or more processors to cause the one or more processors to implement the image capturing method provided in any embodiment of the present application.

Embodiment of the present application further provides a computer-readable storage medium configured to store a computer program, and the computer program, when executed by a processor, implements the image capturing method provided in any embodiment of the present application.

DETAILED DESCRIPTION

Figure 1:
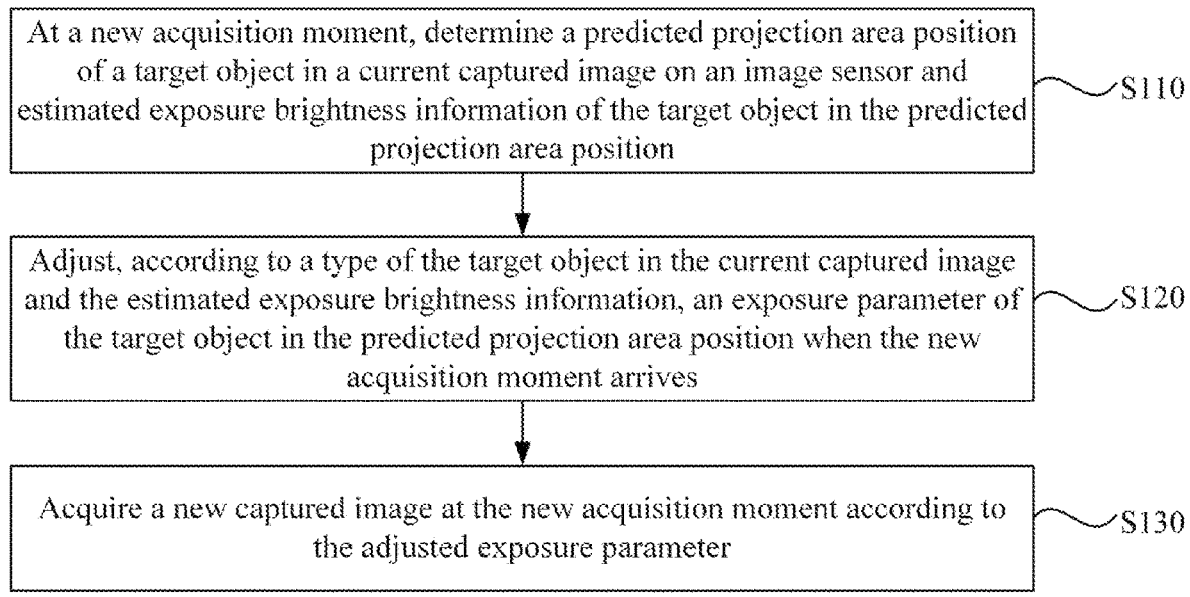
FIG. 1 is a flowchart of an image capturing method according to an embodiment of the present application.

The present application is described below in conjunction with drawings and embodiments. The embodiments described herein are intended to explain the present application and not to limit the present application. For ease of description, only part, not all, of structures related to the present application are illustrated in the drawings.

Before example embodiments are discussed, it is to be noted that some example embodiments are described as processing or methods depicted in flowcharts. Although multiple operations (or steps) are described as sequential processing in the flowcharts, many of the operations (or steps) may be implemented concurrently, coincidently or simultaneously. Additionally, the sequence of the multiple operations may be rearranged. The processing may be terminated when the operations are completed, but the processing may further have additional steps that are not included in the drawings. The processing may correspond to a method, a function, a procedure, a subroutine, a subprogram or the like.

To understand the technical solutions of the present application, the content related to exposure capture in an actual scenario is analyzed here, so as to find the defects of the exposure capture. Generally, a human face and a human body belong to a target object easy to darken, and a license plate belongs to a target object easy to brighten. If the human face, the human body or the license plate appears alone in a captured scene, the brightness of the human face, the human body or the license plate in a captured image can be guaranteed to meet a requirement through the photometry of the human face, the human body or the license plate. However, generally the human face, the human body or the license plate hardly appears alone in the captured image. If the human face, the human body and the license plate appear simultaneously in the captured scene, regardless of any type of photometry used, the brightness effect of only one target object can be ensured, and the brightness effects of all multiple target objects cannot be ensured.

In conjunction with the above analysis of exposure capture, an image capturing method and apparatus, a device and a storage medium are described below through the following embodiments and optional technical solutions in these embodiments.

FIG. 1 is a flowchart of an image capturing method according to an embodiment of the present application. The embodiment of the present application may be applied to the case where a target object in a captured scene is captured, for example, the case where multiple target objects in the captured scene are captured. The method may be performed by an image capturing apparatus, and the image capturing apparatus may be implemented by software and/or hardware and integrated on any electronic device having a network communication function. For example, the electronic device includes, but is not limited to, an electronic capture device, an electronic police device and the like. As shown in FIG. 1, the image capturing method provided in the embodiment of the present application includes the steps below.

In S110, at a new acquisition moment, a predicted projection area position of a target object in a current captured image on an image sensor and estimated exposure brightness information of the target object in the predicted projection area position are determined.

In this embodiment, the current captured image is a captured image obtained at a current acquisition moment. The new acquisition moment refers to an acquisition moment after the current acquisition moment. The electronic device includes the image sensor, and an optical image of an external target object is generated through a lens assembly and projected onto the image sensor. The image sensor converts the projected optical image into an electrical signal that is converted into the captured image after a series of signal processing. Considering that the target object in the current captured image is mobile rather than stationary in most cases, a projection area position of the target object on the image sensor included in the electronic device also changes in the case where the electronic device is fixed. Therefore, a projection area position of the target object on the image sensor and at the new acquisition moment needs to be determined as the predicted projection area position. Considering that the current acquisition moment is a moment that has already occurred and the new acquisition moment is a moment that is about to arrive and has not yet occurred, the predicted projection area position is a projection area position obtained through prediction.

In this embodiment, in an exposure adjustment mode, the current captured image includes the target object, and the target object, for example, may include a human face, a human body, a vehicle body, a license plate and the like. In an actual scenario, for example, in the daytime, the license plate is easily overexposed in a strong front light scenario and the license plate and the human face both have very low brightness in a strong backlight scenario; and at night, the human face has very low brightness and the license plate is easily overexposed. When the optical image of the target object is projected onto the image sensor, the image sensor performs exposure. Considering that multiple types of target object are exposed with different difficulties under the same illumination condition or under different illumination conditions, the exposure brightness of the target object in the projection area position on the image sensor is different under different conditions. Therefore, the estimated exposure brightness information of the target object in the predicted projection area position and at the new acquisition moment needs to be automatically determined. The estimated exposure brightness information includes estimated exposure brightness of the target object in the current captured image in the predicted projection area position and at the new acquisition moment. The exposure brightness refers to the brightness of the target object in the projection area position after the optical image of the target object is projected to the projection area position on the image sensor and exposed.

In an optional implementation of this embodiment, the image capturing method in this embodiment further includes the steps below.

The acquired current captured image is detected in a capturing process; and if it is detected that the current captured image includes the target object, it is determined that the image is captured in the exposure adjustment mode to adjust an exposure parameter.

In this implementation, if the target object does not appear in the captured scene in the capturing process, the case of overexposure or very low brightness generally does not occur in an exposure capturing process. Therefore, the current captured image obtained at the current acquisition moment needs to be acquired in real time and detected. If it is detected that the current captured image includes the target object, it indicates that the target object appears in the captured scene, and the exposure adjustment mode continues being used or a normal exposure mode is switched to the exposure adjustment mode so that an image is captured in the exposure adjustment mode for the exposure parameter to be adjusted. If it is detected that the current captured image does not include the target object, it indicates that the target object disappears from the captured scene, and the normal exposure mode continues being used or the exposure adjustment mode is switched to the normal exposure mode so that the image is captured in the normal exposure mode. For example, when it is detected that the target object appears in the captured scene, the exposure adjustment mode is switched to; when it is detected that the target object disappears from the captured scene, the normal exposure mode is switched back to. The target object is detected in real time, and an exposure mode is switched in real time as the target object appears and disappears.

With the above scheme, adaptive exposure can be performed according to whether the target object appears in the captured scene, and the exposure mode can be automatically switched according to whether the target object appears in the captured scene so that captured images acquired in the presence and absence of the target object can both achieve best effects as much as possible. Meanwhile, considering that the exposure adjustment mode is more complicated than the normal exposure mode in terms of data processing, the target object is detected so that the exposure adjustment mode can be switched to the normal exposure mode in time in the absence of the target object, thereby reducing the complexity of exposure capture to a certain extent.

In this implementation, optionally, in the exposure adjustment mode, if it is detected that the current captured image does not include the target object, the current captured image acquired subsequently continues being detected; if it is determined within a preset time that the target object is still not detected in the current captured image acquired subsequently, the exposure adjustment mode is switched to the normal exposure mode. The above optional implementation has the following advantage: considering that the target object in the current captured image may temporarily disappear and appear again after a while, the above implementation can avoid frequent switching between the exposure adjustment mode and the normal exposure mode and the waste of processing resources.

For example, in the exposure adjustment mode, when the target object disappears from the captured scene, the electronic device continues detecting the captured scene for a preset time period Tn. If it is detected within the preset time period Tn that the target object still does not appear in the captured scene, the exposure mode is switched from the exposure adjustment mode to the normal exposure mode so that the normal exposure mode can ensure the overall effect of the captured scene in the absence of the target object. If it is detected within the preset time period Tn that the target object appears again in the captured scene, the exposure adjustment mode is maintained, and the exposure parameter continues being adjusted in the exposure adjustment mode. The above is cycled so that all-weather adaptive exposure capture is achieved.

In S120, the exposure parameter of the target object in the predicted projection area position is adjusted according to a type of the target object in the current captured image and the estimated exposure brightness information when the new acquisition moment arrives.

In this embodiment, the current captured image may include one or more target objects, and each target object corresponds to one predicted projection area position at the new acquisition moment. If the current captured image includes multiple target objects, separate statistics needs to be performed on the estimated exposure brightness information of each target object in the predicted projection area position and at the new acquisition moment, and exposure parameters used in different predicted projection area positions on the image sensor need to be separately adjusted so that different exposure parameters can be assigned to different areas of the image sensor.

In this embodiment, different target objects belong to different types, and different types of target object are exposed with different difficulties under the same illumination condition. For example, at night, the human face has very low brightness and the license plate is easily overexposed. Therefore, the exposure parameter of the target object in the predicted projection area position and at the new acquisition moment needs to be adjusted in conjunction with the type of the target object in the current captured image and the estimated exposure brightness information of the target object in the predicted projection area position and at the new acquisition moment. The exposure parameter of the target object in the predicted projection area position and at the new acquisition moment refers to an exposure parameter to be used by the image sensor in the predicted projection area position and at the new acquisition moment before the exposure parameter is adjusted. Optionally, the type of the target object may be a type such as the license plate, the vehicle body, the human face and the human body.

With the above technical solution, different exposure parameters can be set for different areas of the image sensor according to the type of the target object and the estimated exposure brightness information of the target object, so as to ensure that exposure capture can be performed at the new acquisition moment by using the adjusted exposure parameter and that different target objects can be exposed by using adapted exposure parameters. It can be seen that the scheme in this embodiment can dynamically and independently adjust exposure parameters of different target objects in projection areas of the image sensor, so as to achieve independent exposure. The scheme may be applied in any time period regardless of the daytime and the night. As long as the exposure of the target objects needs to be adjusted, different projection areas corresponding to different target objects are dynamically determined and exposure parameters in the different projection areas are independently adjusted, so as to achieve independent exposure and ensure that different target objects in a captured image can all reach appropriate capturing brightness.

In S130, a new captured image is acquired at the new acquisition moment according to the adjusted exposure parameter.

In this embodiment, both the new captured image and the current captured image include the target object.

In this embodiment, when the new acquisition moment arrives, the exposure may be performed according to the adjusted exposure parameter in the prediction projection area position, and the new captured image is acquired.

An image capturing scheme is provided in the embodiment of the present application. With the scheme in this embodiment, projection areas of different target objects on the image sensor and at a subsequent acquisition moment can be automatically detected, and an appropriate exposure parameter can be assigned to a projection area where each target object is located according to exposure brightness and to-be-reached target exposure brightness of the projection area where the target object is located so that it is ensured that multiple target objects can all reach desired capturing brightness in the capturing process and it can be ensured that a target object easy to darken or a target object easy to brighten can reach desired brightness.

Figure 2:
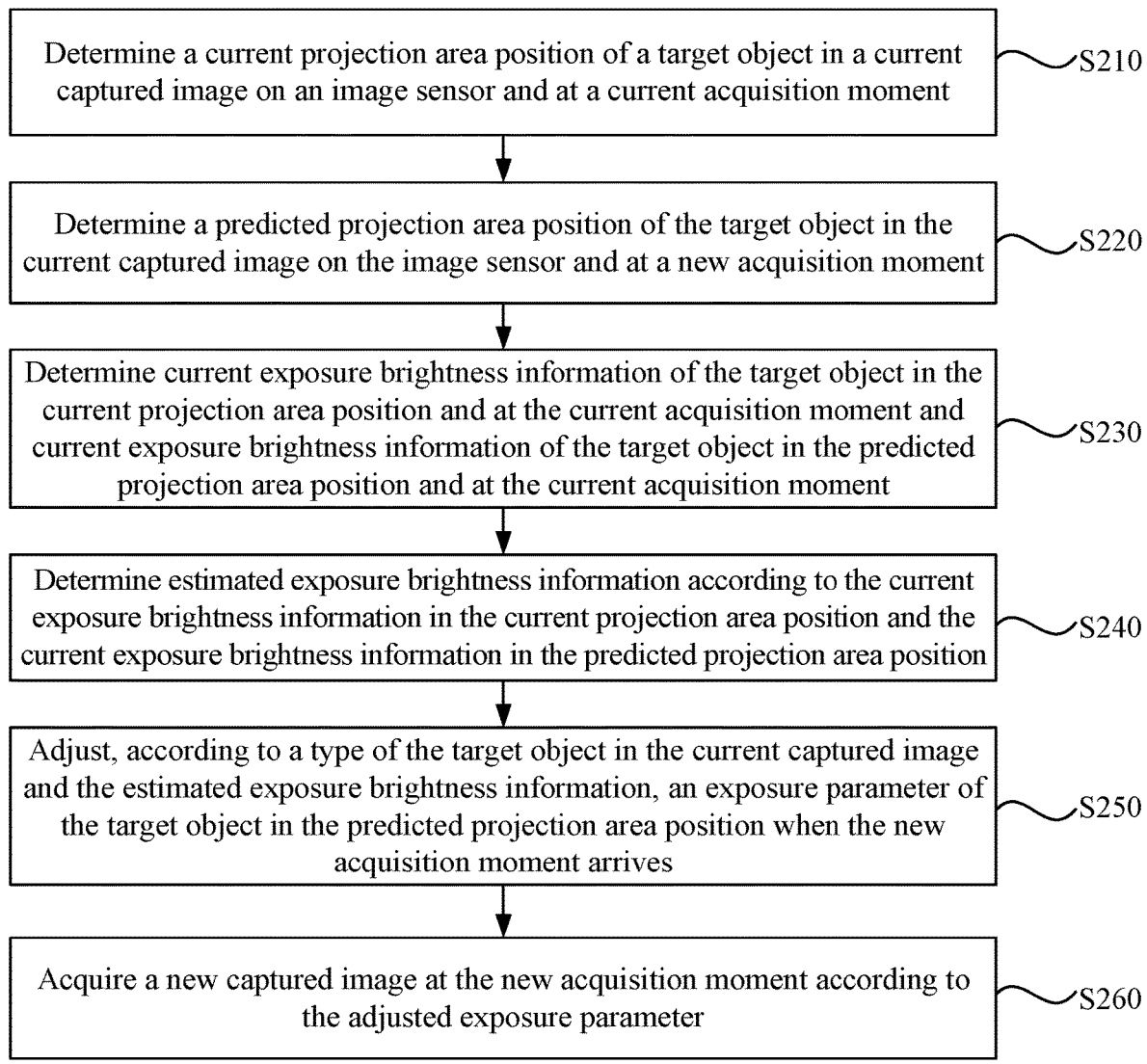
FIG. 2 is a flowchart of another image capturing method according to an embodiment of the present application.

FIG. 2 is a flowchart of another image capturing method according to an embodiment of the present application. Based on the preceding embodiments, S110 in the above embodiment is described in the embodiment of the present application. The embodiment of the present application may be combined with an optional solution in one or more of the preceding embodiments. As shown in FIG. 2, the image capturing method provided in this embodiment includes the steps below.

In S210, a current projection area position of a target object in a current captured image on an image sensor and at a current acquisition moment is determined.

In this embodiment, the step in which the current projection area position of the target object in the current captured image on the image sensor and at the current acquisition moment is determined includes: determining a projection area position of an optical image of the target object on the image sensor when the optical image of the target object in the current captured image is projected onto the image sensor at the current acquisition moment, and recoding the projection area position as the current projection area position. Since the current acquisition moment has already occurred, the current projection area position is a projection area position actually calculated based on the current captured image rather than a predicted projection area position. A time sequence is distinguished by the current acquisition moment and a new acquisition moment.

In S220, a predicted projection area position of the target object in the current captured image on the image sensor and at the new acquisition moment is determined.

In this embodiment, the step in which the predicted projection area position of the target object in the current captured image on the image sensor and at the new acquisition moment is determined includes: predicting a projection area position of the optical image of the target object on the image sensor when the optical image of the target object in the current captured image is projected onto the image sensor at the new acquisition moment, and recoding the projection area position as the predicted projection area position.

In an optional implementation of this embodiment, the step in which the predicted projection area position of the target object in the current captured image on the image sensor and at the new acquisition moment is determined includes steps A10 to A30.

In step A10, a current image position of the target object in the current captured image and at the current acquisition moment is determined.

In this implementation, the current captured image includes the target object. In this case, an image position of the target object in the current captured image may be determined through a target recognition algorithm, that is, the current image position of the target object in the current captured image and at the current acquisition moment is obtained.

In step A20, a motion of the target object is predicted according to the current image position, and a predicted image position of the target object in the current captured image and at the new acquisition moment is determined.

In this implementation, the current image position is a position of the target object in the current captured image and at the current acquisition moment. However, since the target object is generally mobile, motion prediction can be performed on the target object in the current captured image, so as to determine which position in the current captured image the target object is about to move to at the new acquisition moment, that is, the predicted image position of the target object in the current captured image and at the new acquisition moment can be obtained. Optionally, with the current image position of the target object as a starting point, prediction is performed according to a motion direction and a motion speed of the target object in the current captured image, so as to obtain which position in the current captured image the target object is about to move to at the new acquisition moment.

In step A30, the predicted projection area position of the target object on the image sensor and at the new acquisition moment is determined according to the predicted image position.

In this implementation, an imaging plane of the image sensor and a captured image may use the same coordinate division information. If the imaging plane of the image sensor and the captured image use the same coordinate division information, the predicted image position may be directly used as the predicted projection area position of the target object on the image sensor. If the imaging plane of the image sensor and the captured image use different coordinate division information, the predicted projection area position of the target object on the image sensor needs to be determined according to the predicted image position and preset position mapping information. Optionally, the predicted image position may be matched with the preset position mapping information so as to determine a predicted projection area position of the optical image of the target object on the imaging plane of the image sensor and at the new acquisition moment.

In this implementation, the captured image where the target object is located is divided into M×N area blocks, and the imaging plane of the image sensor where the target object is located is divided into m×n area blocks so that an image position of the target object in the captured image and a projection area position of the same target object on the imaging plane of the image sensor have a certain position mapping relationship that is pre-stored. On this basis, position mapping information between the image position and the projection area position of the target object is $$x = f_1(x0) = \text{rounding}\left(\frac{x0}{M} \times m + 0.5\right) \text{ and}$$

$$y = f_2(y0) = \text{rounding}\left(\frac{y0}{N} \times n + 0.5\right).$$

A coordinate (x0, y0) denotes the abscissa and ordinate of the image position of the target object in the captured image, and a coordinate (x, y) denotes the abscissa and ordinate of the projection area position of the target object on the image sensor. To ensure the accuracy of coordinate conversion, a constant of 0.5 is used here.

Figure 3:
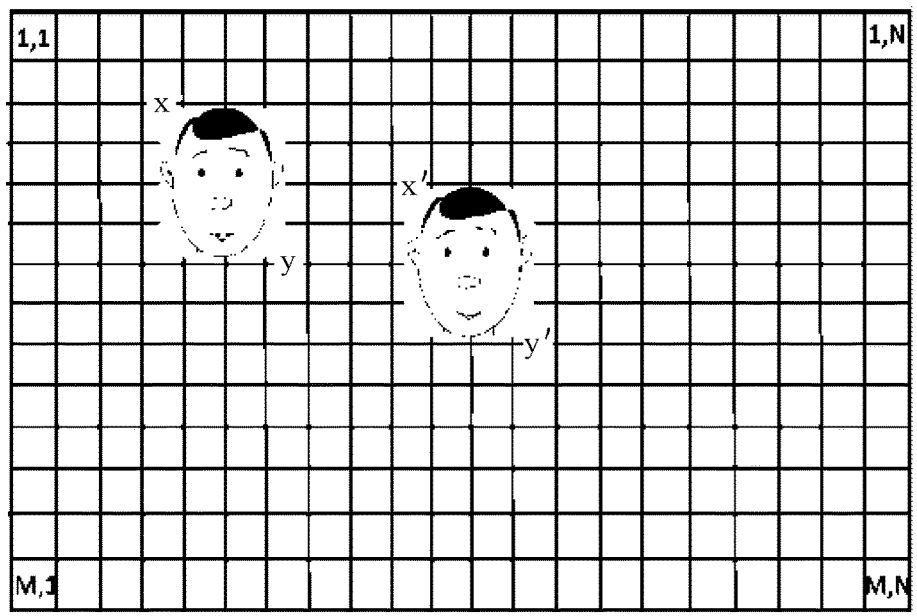
FIG. 3 is a schematic diagram of the determination of a predicted projection area position according to an embodiment of the present application.

For example, FIG. 3 is a schematic diagram of the determination of a predicted projection area position according to an embodiment of the present application. Referring to FIG. 3, in the captured image, coordinate information of the current image position of the target object (a human face) in the current captured image and at the current acquisition moment is denoted as X(x1, y1) and Y(x2, y2). After the motion prediction is performed on the target object, it can be obtained that coordinate information of the predicted image position of the target object in the current captured image and at the new acquisition moment is denoted as X'(x3, y3) and Y'(x4, y4). After the predicted image position, X'(x3, y3) and Y'(x4, y4), of the target object is determined, coordinate information of the predicted projection area position of the target object on the image sensor and at the new acquisition moment may be obtained according to a position conversion relationship included in the position mapping information, where the coordinate information of the predicted projection area position is denoted as X'($f_1$ (x3), $f_2$(y3)) and Y'($f_1$ (x4), $f_2$(y4)).

In an optional implementation of this embodiment, the step in which the current projection area position of the target object in the current captured image on the image sensor and at the current acquisition moment is determined includes steps B10 and B20.

In step B10, the current image position of the target object in the current captured image and at the current acquisition moment is determined, where the current captured image includes the target object.

In step B20, the current projection area position of the target object on the image sensor and at the current acquisition moment is determined according to the current image position.

In this embodiment, optionally, the current image position may be matched with the preset position mapping information so as to determine a current projection area position of the optical image of the target object on the imaging plane of the image sensor and at the current acquisition moment.

For example, still using the target object in FIG. 3 as an example, after the current image position, X(x1, y1) and Y(x2, y2), of the target object is determined, coordinate information of the current projection area position of the target object on the image sensor and at the current acquisition moment may be obtained according to the position conversion relationship included in the position mapping information, where the coordinate information of the current projection area position is denoted as X($f_1$ (x1), $f_2$(y1)) and Y($f_1$(x2), $f_2$(y2)).

In S230, current exposure brightness information of the target object in the current projection area position and at the current acquisition moment and current exposure brightness information of the target object in the predicted projection area position and at the current acquisition moment are determined.

In this embodiment, the optical image of the target object in the current captured image is projected onto the image sensor at the current acquisition moment, and the image sensor exposes the optical image of the target object according to an exposure parameter. After the target object is exposed, the brightness of the target object in the current projection area position on the image sensor is recorded as the current exposure brightness information of the target object in the current projection area position and at the current acquisition moment. The current exposure brightness information of the target object in the predicted projection area position and at the current acquisition moment may be obtained in the same calculation manner.

For example, it is assumed that the coordinates of the current projection area position of the target object at the current acquisition moment are X($f_1$(x1), $f_2$(y1)) and Y($f_1$(x2), $f_2$(y2)) and the coordinates of the predicted projection area position of the target object at the new acquisition moment are X'($f_1$(x3), $f_2$(y3)) and Y'($f_1$(x4), $f_2$(y4)). Then, the current exposure brightness information of the target object in the current projection area position and at the current acquisition moment is $$L_{current1} = \frac{\sum_{x=f_1(x1)}^{f_1(x2)} \sum_{y=f_2(y1)}^{f_2(y2)} l(x, y)}{(f_1(x2) - f_1(x1)) \times (f_2(y2) - f_2(y1))},$$

and the current exposure brightness information of the target object in the predicted projection area position and at the current acquisition moment is $$L_{current2} = \frac{\sum_{x=f_1(x3)}^{f_1(x4)} \sum_{y=f_2(y3)}^{f_2(y4)} l(x, y)}{(f_1(x4) - f_1(x3)) \times (f_2(y4) - f_2(y3))}.$$

l(x, y) denotes brightness in a projection area position whose coordinate is (x, y) on the image sensor at the current acquisition moment.

In S240, estimated exposure brightness information is determined according to the current exposure brightness information in the current projection area position and the current exposure brightness information in the predicted projection area position.

In this embodiment, after the current exposure brightness information of the target object in the current projection area position and at the current acquisition moment and the current exposure brightness information of the target object in the predicted projection area position and at the current acquisition moment are obtained, a weighted average calculation is performed according to a preset weight ratio, and an obtained weighted average brightness value is used as the estimated exposure brightness information of the target object in the predicted projection area position and at the new acquisition moment. For example, the weighted average brightness value is $L = m1 \times L_{current1} + m2 \times L_{current2}$, where m1+m2=1.

The above implementation has the following advantage: considering that the predicted projection area position obtained through prediction is not necessarily very accurate and may have a certain error, when exposure brightness of the target object in the predicted projection area position is estimated, reference cannot be made to only brightness in the predicted projection area position and also needs to be made to brightness of the target object in the current projection area position on the image sensor, and accurate exposure brightness of the target object in the predicted projection area position and at the new acquisition moment can be obtained only in conjunction with brightness in two projection area positions.

In S250, an exposure parameter of the target object in the predicted projection area position is adjusted according to a type of the target object in the current captured image and the estimated exposure brightness information when the new acquisition moment arrives.

In S260, a new captured image is acquired at the new acquisition moment according to the adjusted exposure parameter.

An image capturing scheme is provided in the embodiment of the present application. With the scheme in this embodiment, projection areas of different target objects on the image sensor and at a subsequent acquisition moment can be automatically detected, and an appropriate exposure parameter can be assigned to a projection area where each target object is located according to exposure brightness and to-be-reached target exposure brightness of the projection area where the target object is located so that it is ensured that multiple target objects can all reach desired capturing brightness in a capturing process and it can be ensured that a target object easy to darken or a target object easy to brighten can reach desired brightness. Meanwhile, when estimated exposure brightness of the target object in a predicted projection area is determined, current exposure brightness of the target object in the current projection area position and the predicted projection area position is fully considered so that the obtained estimated exposure brightness approximates better to the exposure brightness in the predicted projection area position in an actual scenario.

Figure 4:
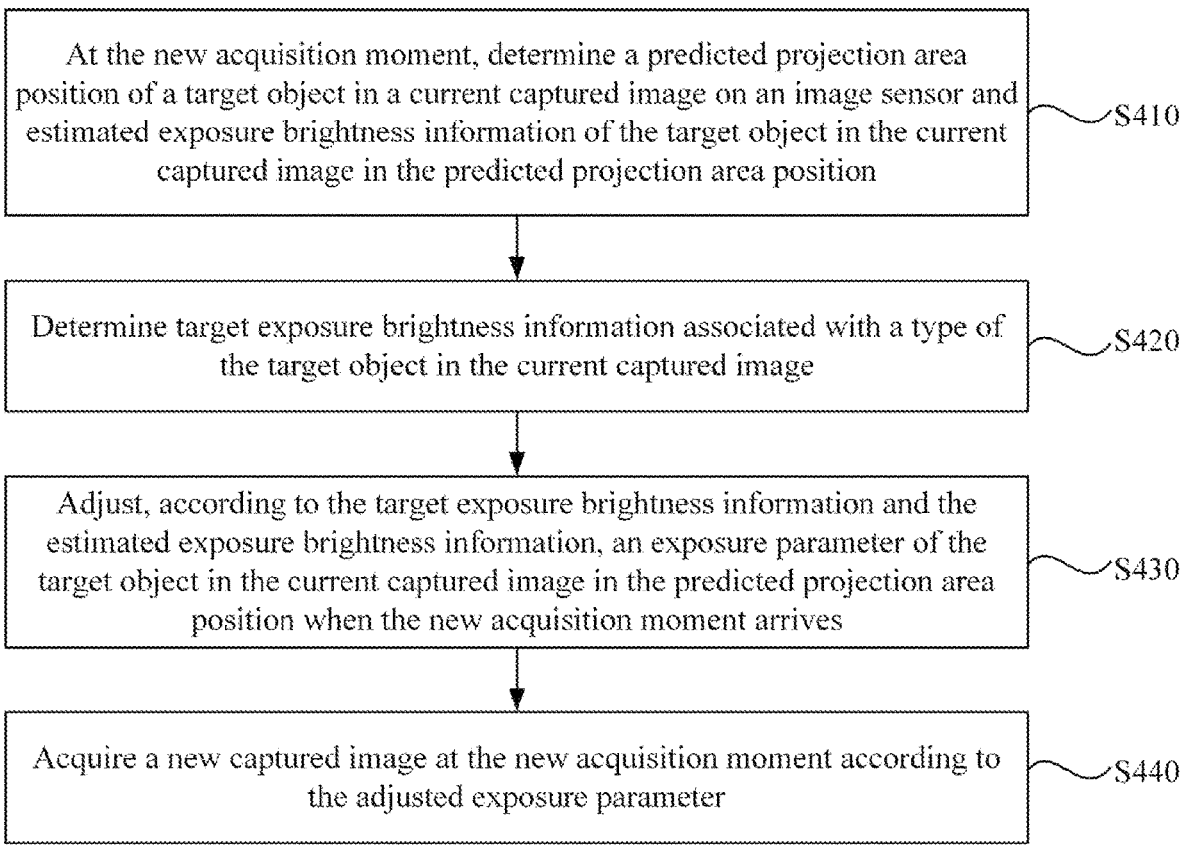
FIG. 4 is a flowchart of another image capturing method according to an embodiment of the present application.

FIG. 4 is a flowchart of another image capturing method according to an embodiment of the present application. Based on the preceding embodiments, S120 and S250 in the above embodiments are described in the embodiment of the present application. The embodiment of the present application may be combined with an optional solution in one or more of the preceding embodiments. As shown in FIG. 4, the image capturing method in this embodiment includes the steps below.

In S410, a predicted projection area position of a target object in a current captured image on an image sensor and at a new acquisition moment is determined, and estimated exposure brightness information of the target object in the current captured image in the predicted projection area position and at the new acquisition moment is determined.

In S420, target exposure brightness information associated with a type of the target object in the captured image is determined.

In this embodiment, the current captured image may include multiple target objects, and each target object corresponds to one projection area on the image sensor. Thus, the image sensor includes multiple projection areas. Different types of target object require that different target exposure brightness be satisfied. Therefore, when an exposure adjustment is separately performed on each target object, the target exposure brightness information associated with the type of each target object needs to be determined so that whether to adjust an exposure parameter is determined according to the target exposure brightness information.

In S430, the exposure parameter of the target object in the current captured image in the predicted projection area position is adjusted according to the target exposure brightness information and the estimated exposure brightness information when the new acquisition moment arrives.

In this embodiment, for each target object in the current captured image, brightness difference information between the target exposure brightness information associated with the type of the target object and the estimated exposure brightness information of the target object in the predicted projection area position and at the new acquisition moment is determined. If it is detected that the brightness difference information does not satisfy preset difference information, the exposure parameter of the target object in the predicted projection area position when the new acquisition moment arrives is adjusted according to the brightness difference information. If it is detected that the brightness difference information satisfies the preset difference information, the exposure parameter of the target object in the predicted projection area position is not adjusted and the original exposure parameter is maintained.

Figure 5:
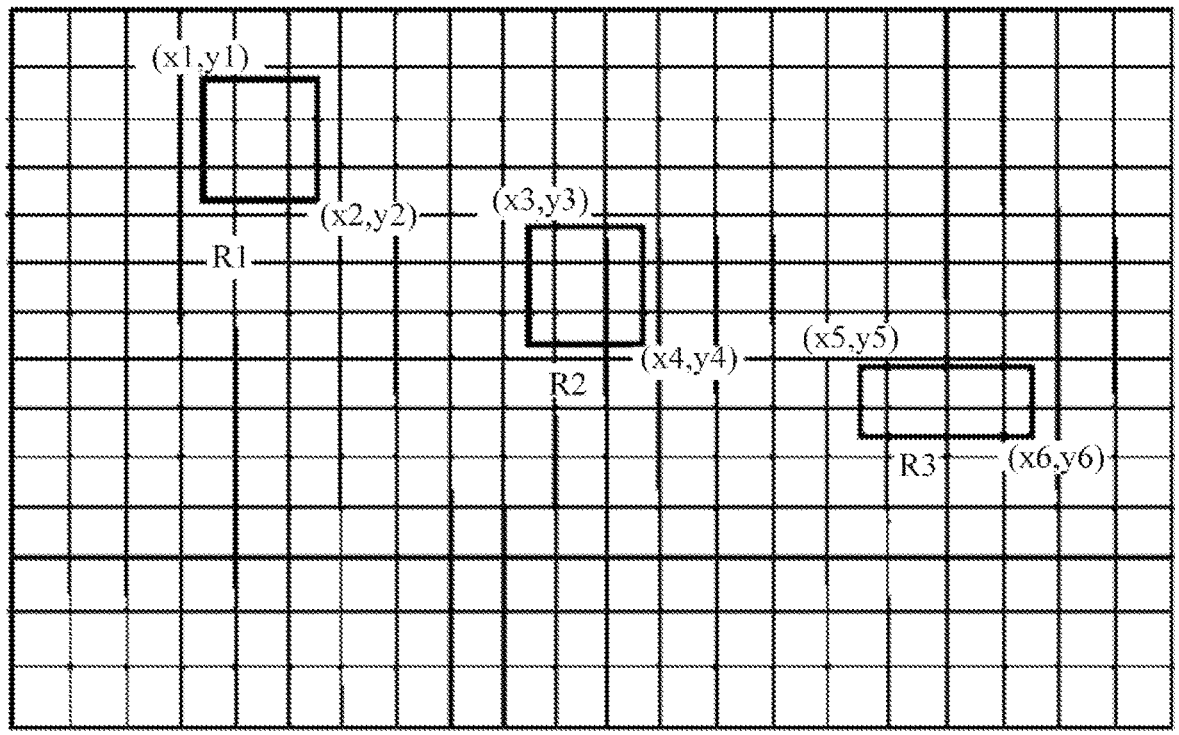
FIG. 5 is a schematic diagram of projection areas on an image sensor according to an embodiment of the present application.

For example, FIG. 5 is a schematic diagram of projection areas on an image sensor according to an embodiment of the present application. Referring to FIG. 5, projection areas of all target objects in the current captured image on the image sensor include R1, R2 and R3, and the exposure brightness of multiple target objects in their corresponding projection area positions is denoted as Lr1, Lr2 and Lr3, separately. Lr1, Lr2 and Lr3 are compared with target exposure brightness T1 associated with Lr1, target exposure brightness T2 associated with Lr2 and target exposure brightness T3 associated with Lr3, respectively. Then, automatic exposure (AE) is adjusted in real time and corresponding exposure parameters are delivered to multiple projection areas on the image sensor until the exposure brightness of the target objects in the projection area positions reaches desired target exposure brightness values.

In this embodiment, optionally, the step in which the exposure parameter of the target object in the predicted projection area position when the new acquisition moment arrives is adjusted according to the brightness difference information includes: determining exposure amount adjustment information of the target object in the predicted projection area position according to an exposure brightness difference value included in the brightness difference information; and adjusting the exposure parameter of the target object in the predicted projection area position on the image sensor is adjusted according to the exposure amount adjustment information when the new acquisition moment arrives. For example, if the exposure brightness of the target object is lower than the target exposure brightness, T1=Lr1+δ and the exposure parameter in the predicted projection area position needs to be adjusted through an increase of an exposure amount; if the exposure brightness of the target object is higher than the target exposure brightness, T1=Lr1−δ and the exposure parameter in the predicted projection area position needs to be adjusted through a decrease of the exposure amount; where δ denotes a calculated increase or decrease of the exposure amount.

In S440, a new captured image is acquired at the new acquisition moment according to the adjusted exposure parameter.

In an optional implementation of this embodiment, before the new captured image is acquired according to the adjusted exposure parameter, the image capturing method in this embodiment further includes the steps C10 and C20 below.

In step C10, the projection area of the target object on the image sensor is removed from a photometry area, and photometry is performed on the photometry area after removal.

In step C20, exposure amount information of the photometry area is determined according to a photometry result, and an exposure parameter used by a non-target object in a projection area on the image sensor and at the new acquisition moment is adjusted according to the exposure amount information of the photometry area.

Figure 6:
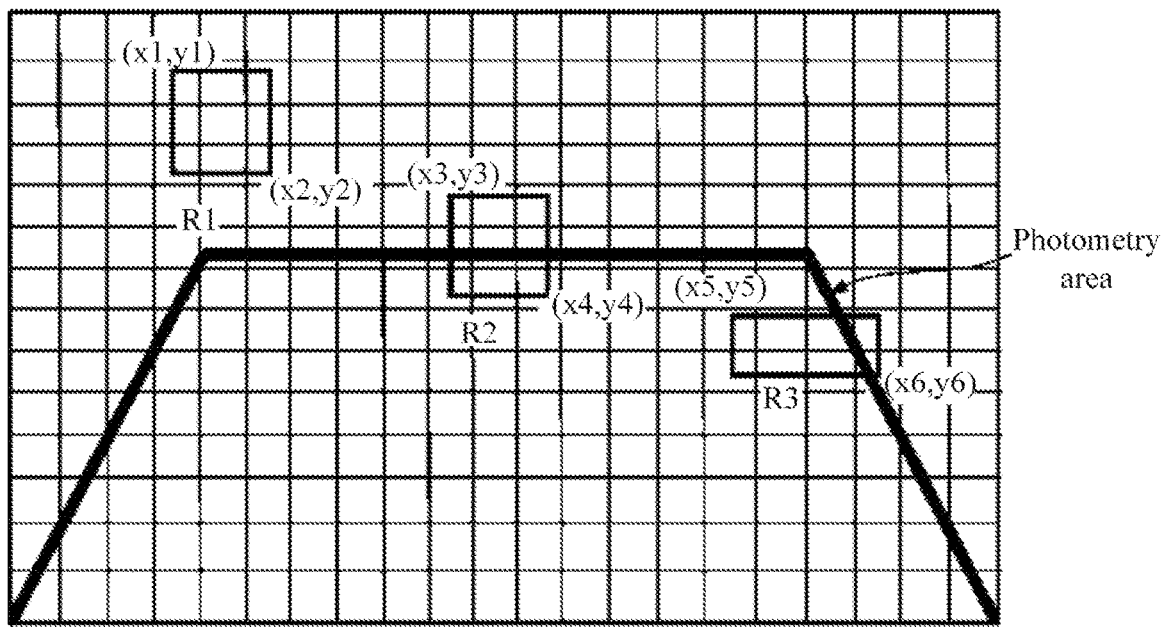
FIG. 6 is a schematic diagram of a photometry area according to an embodiment of the present application.

In this implementation, FIG. 6 is a schematic diagram of a photometry area according to an embodiment of the present application. Referring to FIG. 6, for the projection area of the non-target object on the image sensor, the projection area of the target object on the image sensor is removed for statistics, and the photometry area and a weight are consistent with those in the absence of the target object. That is, information in the projection area of the target object on the image sensor is subtracted from the photometry area, and the information in the projection area of the target object on the image sensor is also subtracted from a non-photometry area. Then, the brightness of the whole image is calculated according to the weight, and the exposure parameter of the non-target object in the projection area on the image sensor is provided. Weighted average brightness of the non-target object in the projection area on the image sensor is expressed as follows:

$$Lr0 = \frac{\sum_{p=1}^{P} \sum_{q=1}^{Q} pix(p,q) \times \omega(p,q) - \sum_{k=1}^{n} \sum_{p=x(2\times i-1)}^{x(2\times i)} \sum_{q=y(2\times i-1)}^{y(2\times i)} pix(p,q) \times \omega(p,q)}{\sum_{p=1}^{P} \sum_{q=1}^{Q} \omega(p,q) - \sum_{k=1}^{n} \sum_{p=x(2\times i-1)}^{x(2\times i)} \sum_{q=y(2\times i-1)}^{y(2\times i)} \omega(p,q)};$$

where ω(p, q) denotes a weight of a pixel (p, q) in a captured image or on an imaging plane of the image sensor. With pix(p, q)=shutter(p, q)×gain(p, q) known, the exposure parameter of the non-target object in the projection area on the image sensor after stable exposure may be obtained according to ABS(Lr0−L0)<δ1, and the exposure parameter is denotes as a shutter parameter shutter0 and a gain parameter gain0, where pix denotes a pixel, Lr0 denotes the weighted average brightness of the non-target object in the projection area on the image sensor, L0 denotes a target brightness value of the non-target object in the projection area on the image sensor and is a constant, δ1 denotes an error range, P and Q denote a width and a height of the captured image, respectively, and n denotes the number of target objects in the captured image.

In this implementation, considering the stability of exposure and the degree of natural transition in brightness between the projection area of the target object on the image sensor and the projection area of the adjacent non-target object on the image sensor, an adjustment range of the exposure parameter of the target object in the projection area on the image sensor is limited. Thus, an exposure parameter gain_i for exposure adjustment of the target object in the projection area on the image sensor is obtained as follows:

$$ABS(Lri-Li)<\delta2, gain \in [gain0-\varepsilon1, gain0+\varepsilon1],$$

$$shutter \in [shutter0-\varepsilon2, shutter0+\varepsilon2];$$

where gain ∈ [gain0−ε1, gain0+ε1] denotes a range of a gain parameter, shutter ∈ [shutter0−ε2, shutter0+ε2] denotes a range of a shutter parameter, Lri denotes average brightness of an i-th object in a projection area (for example, current exposure brightness of the target object and the weighted average brightness of the non-target object), and Li denotes a target brightness value of the i-th object in the projection area and is a constant.

In this implementation, the exposure parameter may be adjusted in the following manner: a shutter and another exposure parameter of the target object in the prediction projection area on the image sensor are adjusted. Projection areas of non-target objects on the image sensor are mostly the background and include no target object, and an exposure principle that a shutter is slowed down and a gain is as small as possible is preferentially selected for the adjustment of the exposure parameter.

In this implementation, the projection areas of multiple target objects on the image sensor and the projection area of the non-target object on the image sensor are dynamically and independently exposed, the independent exposure process may be applied in any time period regardless of the daytime and the night. As long as the exposure of the target object needs to be adjusted, each area is determined and the exposure is adjusted dynamically. Additionally, the projection areas of the target objects on the image sensor may be several specified areas where brightness statistics and exposure are the same as those described above, and a human face, a human body, a license plate, a vehicle body or another target object may be in the areas.

An image capturing scheme is provided in the embodiment of the present application. With the scheme in this embodiment, projection areas of different target objects on the image sensor and at a subsequent acquisition moment can be automatically detected, and an appropriate exposure parameter can be assigned to the projection area where each target object is located according to exposure brightness and to-be-reached target exposure brightness of the projection area where the target object is located so that it is ensured that multiple target objects can all reach desired capturing brightness in a capturing process and, in particular, it can be ensured that a target object easy to darken or a target object easy to brighten can reach desired brightness.

Figure 7:
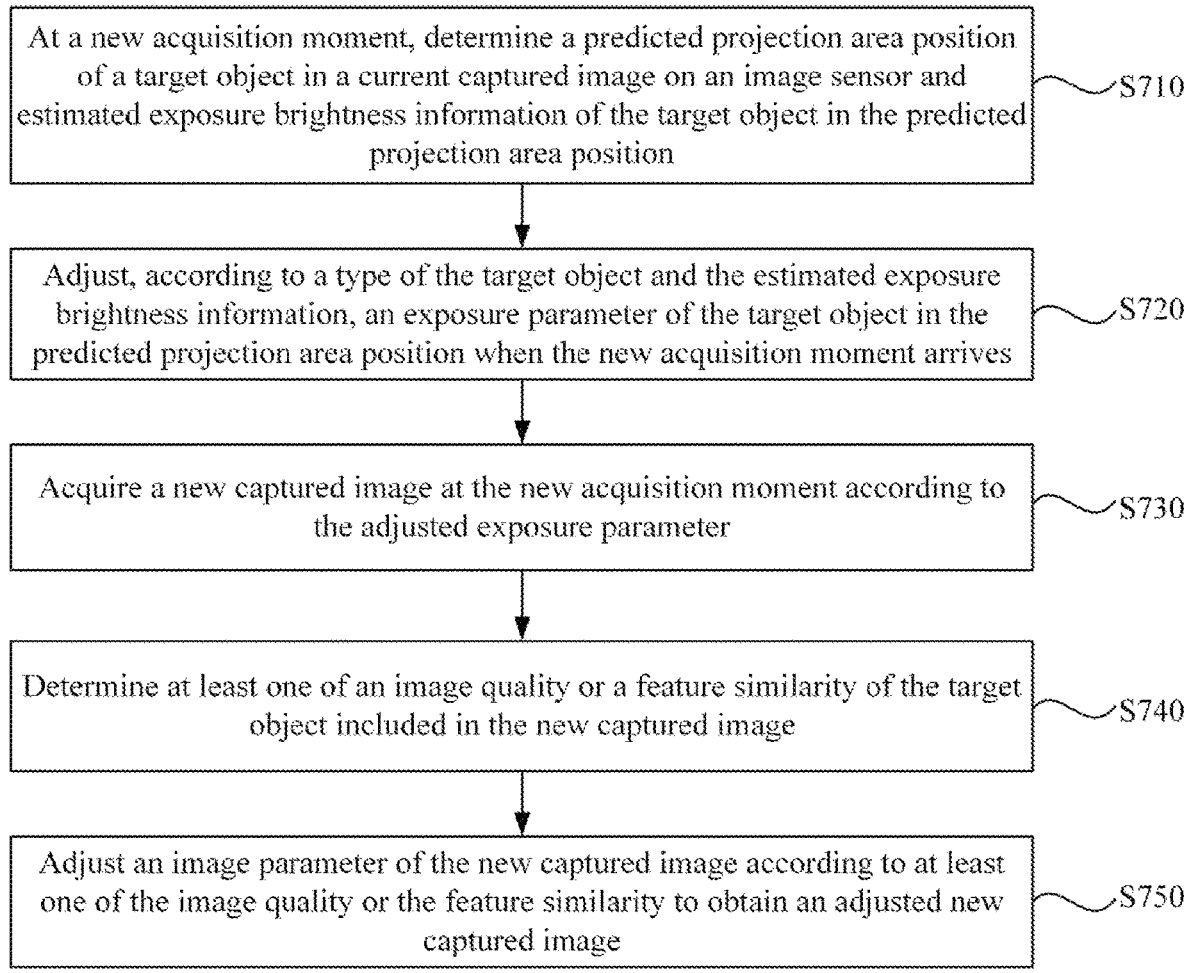
FIG. 7 is a flowchart of another image capturing method according to an embodiment of the present application.

FIG. 7 is a flowchart of another image capturing method according to an embodiment of the present application. The embodiment of the present application is described based on the preceding embodiments, and the embodiment of the present application may be combined with an optional solution in one or more of the preceding embodiments. As shown in FIG. 7, the image capturing method provided in the embodiment of the present application includes the steps below.

In S710, at a new acquisition moment, a predicted projection area position of a target object in a current captured image on an image sensor and estimated exposure brightness information of the target object in the predicted projection area position are determined.

In S720, an exposure parameter of the target object in the predicted projection area position is adjusted according to a type of the target object and the estimated exposure brightness information when the new acquisition moment arrives.

In S730, a new captured image is acquired at the new acquisition moment according to the adjusted exposure parameter.

In S740, at least one of an image quality or a feature similarity of the target object included in the new captured image is determined.

In this embodiment, after exposure capture is performed according to the adjusted exposure parameter and the new captured image is acquired, online evaluation may be performed on the image quality of the new captured image, so as to determine an image quality effect of the target object in the new captured image. If the target object is a human face, the image quality of the human face included in the new captured image may be evaluated and determined by at least one of: a human face brightness evaluation value Y1, a human face sharpness evaluation value Ts, a human face noise evaluation value Nn or a human face skin color evaluation value C. If the image quality is evaluated using the above four criteria and the weights of the above four criteria are W1, W2, W3 and W4, separately, the image quality of the human face in the captured image is Face Value=Y1×W1+Ts×W2+Nn×W3+C×W4. If the target object is a license plate, the image quality of the license plate included in the new captured image may be evaluated and determined by at least one of: a license plate brightness evaluation value Y1c, a license plate sharpness evaluation value Tsc, a license plate noise evaluation value Nnc or a license plate color evaluation value Cc. If the image quality is evaluated using the above four criteria and the weights of the above four criteria are Wc1, Wc2, Wc3 and Wc4, separately, the image quality of the license plate in the captured image is Car=Y1c×Wc1+Tsc×Wc2+Nnc×Wc3+Cc×Wc4.

In this embodiment, after the new captured image is acquired, the feature similarity of the new captured image may also be determined, so as to determine a similarity of the target object in the new captured image. Optionally, the feature similarity of the new captured image is calculated through artificial intelligence (AI). Using the evaluation of the image quality of the human face as an example, the image quality of the human face and the feature similarity of the human face are evaluated. The process is described below.

(1) Human Face Brightness Evaluation

Average brightness of an image I of the human face is calculated as follows:

$$L = \frac{1}{P \times Q} \sum_{p=1}^{P} \sum_{q=1}^{Q} Gray(p, q)$$

where Gray(p, q) denotes a grayscale value of a pixel (p, q), and P and Q denote a width and a height of the image of the human face, respectively.

A human face brightness evaluation function is as follows:

$$Y1 = \begin{cases} \frac{L-t1}{t2-t1} \times 100, & t1 \le L < t2 \\ 100, & t2 \le L < t3 \\ 100 - \frac{L-t3}{t4-t3} \times 60, & t3 \le L < t4 \\ 40, & t4 \le L < t5 \\ 0, & \text{other} \end{cases};$$

where t1=40, t2=110, t3=140, t4=180 and t5=195 denote boundary thresholds and may be adjusted according to actual requirements.

(2) Human Face Sharpness Evaluation

A fuzzy image of the human face in the new captured image is obtained by using a low-pass filter and the fuzzy image of the human face is subtracted from an original image of the human face, so as to obtain an edge image of the human face for representing sharpness of the human face. Assuming that the original image of the human face is I and the low-pass filter is F, the edge image of the human face is $I_1=I-I \otimes F$.

Thus, an average value of the sharpness of the human face may be obtained as follows:

$$S = \frac{1}{P \times Q} \sum_{p=1}^{P} \sum_{q=1}^{Q} I_1(p, q).$$

A human face sharpness evaluation function is as follows:

$$Ts = \begin{cases} \frac{S-t1}{t2-t1} \times 100, & t1 \le S < t2 \\ 100, & t2 \le S < t3 \\ 100 - \frac{S-t3}{t4-t3} \times 100, & t3 \le S < t4 \\ 0, & \text{other} \end{cases}$$

where t1, t2, t3, and t4 denote boundary thresholds and may be adjusted according to actual requirements.

(3) Human Face Noise Evaluation

A noise-reduced image of the human face is obtained using a smoothing filter and the noise-reduced image of the human face is subtracted from the original image, so as to obtain a noise image. Assuming that the original image is I and the smoothing filter is G, the noise image is $I_2=I-I \otimes G$.

Thus, an average value of noise of the human face may be obtained as follows:

$$N = \frac{1}{P \times Q} \sum_{p=1}^{P} \sum_{q=1}^{Q} I_2(p, q);$$

where p, q denotes a subscript of a pixel in the image, and P and Q denote the width and the height of the image of the human face, respectively.

A human face noise evaluation function is as follows:

$$Nn = \begin{cases} 100, & N \le t1 \\ 100 - \frac{N-t1}{t2-t1} \times 100, & t1 \le N < t2 \\ \frac{(N-t2)}{t3-t2} \times 100, & t2 \le N < t3 \\ 0, & \text{other} \end{cases};$$

where t1=1, t2=3 and t3=5 denote boundary thresholds and may be adjusted according to actual requirements.

(4) Human Face Skin Color Evaluation

Information about U and V channels of the human face in the new captured image is extracted, so as to obtain an average difference in a color gamut as $$\frac{1}{P \times Q} \sum_{p=1}^{P} \sum_{q=1}^{Q} (U(p, q) - V(p, q)).$$

A human face skin color evaluation function is as follows:

$$Cf = \begin{cases} 100 \times \left(e^{-\frac{(f-A)^2}{2 \times \left(\left(\frac{m1}{2}\right)^2\right)}}\right), & f \le A-1 \\ 100, & A-1 \le f < B \\ 100 \times \left(e^{-\frac{(f-B)^2}{2 \times (m1^2)}}\right), & B \le f < B+2 \\ -k \times (f-B-2), & \text{other} \end{cases}.$$

If an average sum value of the color gamut is denoted as $$X = \frac{1}{P \times Q} \sum_{p=1}^{P} \sum_{q=1}^{Q} (U(p, q) + V(p, q)),$$

then A=m1−((X>3)×(X−m1))×0.5, where m1=3, B=5, and k=0.7, the parameters in the formula may be adjusted according to actual requirements.

In this case, an evaluation value of the image quality of the human face is FaceValue=Y1×W1+Ts×W2+Nn×W3+Cf×W4. W1+W2+W3+W4=1.

The feature similarity of the human face is evaluated below.

A Euclidean distance between feature coordinate points in a feature point set H of the human face in the new captured image is calculated so as to obtain a distance matrix DS.

It is assumed that the feature point set H of the human face including n points in a two-dimensional space is H={(xi, yi)}, where i=1, 2, . . . , n, and (xi, yi) denotes a coordinate of an i-th feature point.

The distance matrix of H is defined as DSi,j={$\sqrt{(xi-xj)^2+(yi-yj)^2}$}, where i=1, 2, . . . , n, and j=1, 2, . . . , n.

The following elements in DS constitute a feature vector Tf, where Tf={di,j|i≥j; i=1, 2, . . . , n; j=1, 2, . . . , n}, where di,j denotes a distance between the i-th feature point and a j-th feature point.

An average absolute error of two vectors is calculated and then normalized, so as to obtain the similarity of the human face.

It can be seen that through the above process, the evaluation value of the image quality of the human face and an evaluation value of the feature similarity of the human face can be obtained, separately. Whether a capturing effect of the target object in the new captured image can meet a requirement of human eyes is determined according to the evaluation value of the image quality, and whether the capturing effect of the target object in the new captured image can meet an AI similarity recognition requirement is determined according to the evaluation value of the feature similarity of the human face.

In S750, an image parameter of the new captured image is adjusted according to the image quality and/or the feature similarity so as to obtain the adjusted new captured image.

In this embodiment, after the image quality and the feature similarity are obtained, whether target requirements are met may be determined according to the image quality and the feature similarity, so as to perform targeted adjustment on the image parameter of the new captured image. After the adjustment, real-time evaluation is performed and then the image parameter is adjusted, where the similarity is evaluated synchronously. In this manner, the image parameter is cyclically adjusted until the evaluation value of the image quality and the evaluation value of the feature similarity both meet the target requirements so that the adjusted new captured image can be obtained.

An image capturing scheme is provided in the embodiment of the present application. With the scheme in this embodiment, projection areas of different target objects on the image sensor and at a subsequent acquisition moment can be automatically detected, and an appropriate exposure parameter can be assigned to a projection area where each target object is located according to exposure brightness and to-be-reached target exposure brightness of the projection area where the target object is located so that it is ensured that multiple target objects can all reach desired capturing brightness in a capturing process and, in particular, it can be ensured that a target object easy to darken or a target object easy to brighten can reach desired brightness. Meanwhile, the online evaluation is performed on the image quality, exposure is adjusted in real time, and ISP-related processing is performed at the same time, so as to ensure that the image quality of the target object can meet both an AI recognition requirement and a visual requirement of human eyes.

Figure 8:
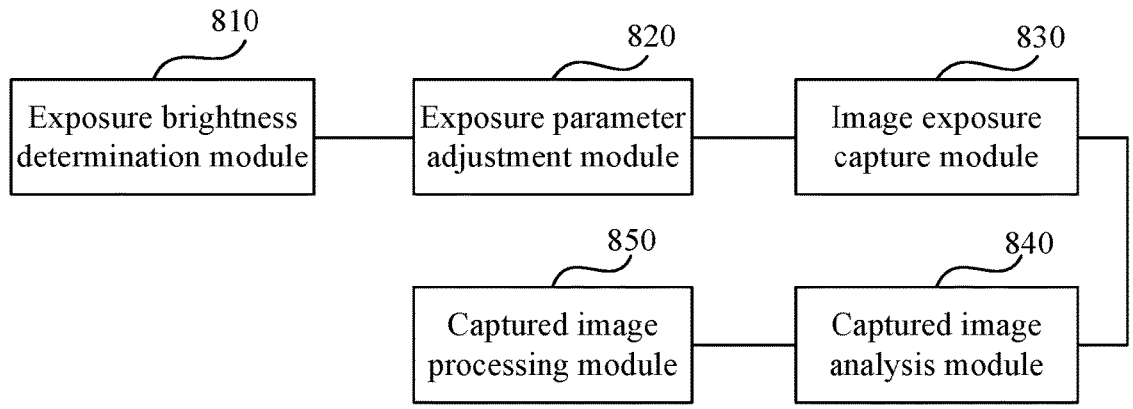
FIG. 8 is a block diagram of an image capturing apparatus according to an embodiment of the present application.

FIG. 8 is a block diagram of an image capturing apparatus according to an embodiment of the present application. The embodiment of the present application may be applied to the case where a target object in a captured scene is captured, for example, the case where multiple target objects in the captured scene are captured. The apparatus may be implemented by software and/or hardware and integrated on any electronic device having a network communication function. For example, the electronic device includes, but is not limited to, an electronic capture device, an electronic police device and the like. As shown in FIG. 8, the image capturing apparatus provided in the embodiment of the present application includes an exposure brightness determination module 810, an exposure parameter adjustment module 820 and an image exposure capture module 830.

The exposure brightness determination module 810 is configured to determine a predicted projection area position of a target object in a current captured image on an image sensor and at a new acquisition moment and determine estimated exposure brightness information of the target object in the predicted projection area position and at the new acquisition moment. The exposure parameter adjustment module 820 is configured to adjust, according to a type of the target object and the estimated exposure brightness information, an exposure parameter of the target object in the predicted projection area position when the new acquisition moment arrives. The image exposure capture module 830 is configured to acquire a new captured image at the new acquisition moment according to the adjusted exposure parameter, where both the new captured image and the current captured image include the target object.

Based on the preceding embodiments, optionally, the exposure brightness determination module 810 is configured to perform the steps below.

A current projection area position of the target object on the image sensor and at a current acquisition moment is determined. Current exposure brightness information of the target object in the current projection area position and at the current acquisition moment and current exposure brightness information of the target object in the predicted projection area position and at the current acquisition moment are determined. The estimated exposure brightness information is determined according to the current exposure brightness information in the current projection area position and the current exposure brightness information in the predicted projection area position.

Based on the preceding embodiments, optionally, the exposure brightness determination module 810 is configured to perform the steps below.

A current image position of the target object in the current captured image and at the current acquisition moment is determined. A motion of the target object is predicted according to the current image position and a predicted image position of the target object in the current captured image and at the new acquisition moment is determined. The predicted projection area position of the target object on the image sensor is determined according to the predicted image position.

The exposure brightness determination module 810 is configured to perform the step below.

The current projection area position of the target object on the image sensor and at the current acquisition moment is determined according to the current image position.

Based on the preceding embodiments, optionally, the exposure parameter adjustment module 820 includes a target brightness determination unit and an exposure parameter adjustment unit.

The target brightness determination unit is configured to determine target exposure brightness information associated with the type of the target object.

The exposure parameter adjustment unit is configured to adjust, according to the target exposure brightness information and the estimated exposure brightness information, the exposure parameter of the target object in the predicted projection area position when the new acquisition moment arrives.

Based on the preceding embodiments, optionally, the exposure parameter adjustment unit is configured to perform the steps below.

Brightness difference information between the target exposure brightness information and the estimated exposure brightness information is determined. If it is detected that the brightness difference information does not satisfy preset difference information, the exposure parameter of the target object in the predicted projection area position is adjusted according to the brightness difference information when the new acquisition moment arrives.

Based on the preceding embodiments, optionally, the apparatus further includes a captured image analysis module 840 and a captured image processing module 850.

The captured image analysis module 840 is configured to determine an image quality and/or a feature similarity of the target object included in the new captured image.

The captured image processing module 850 is configured to adjust an image parameter of the new captured image according to the image quality and/or the feature similarity to obtain the adjusted new captured image.

The image capturing apparatus provided in the embodiment of the present application may perform the image capturing method provided in any one of the preceding embodiments of the present application and has functions and effects corresponding to the image capturing method performed. For a process, reference is made to related operations in the image capturing method in the preceding embodiments.

Figure 9:
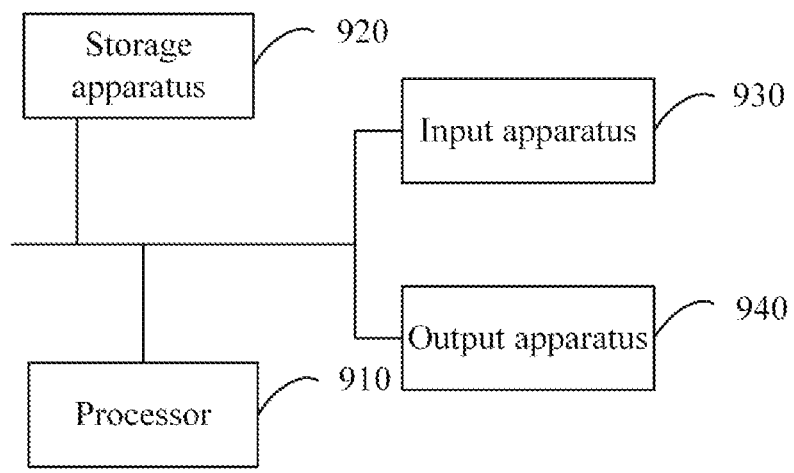
FIG. 9 is a structural diagram of an electronic device according to an embodiment of the present application.

FIG. 9 is a structural diagram of an electronic device according to an embodiment of the present application. As shown in FIG. 9, the electronic device provided in the embodiment of the present application includes one or more processors 910 and a storage apparatus 920. One or more processors 910 may be disposed in the electronic device, where one processor 910 is shown as an example in FIG. 9. The storage apparatus 920 is configured to store one or more programs, where the one or more programs are executed by the one or more processors 910 to cause the one or more processors 910 to implement the image capturing method described in any one of the embodiments of the present application.

The electronic device may further include an input apparatus 930 and an output apparatus 940.

The processor 910, the storage apparatus 920, the input apparatus 930 and the output apparatus 940 in the electronic device may be connected via a bus or in other manners, where the connection via a bus is shown as an example in FIG. 9.

As a computer-readable storage medium, the storage apparatus 920 in the electronic device may be configured to store one or more programs. The programs may be software programs, computer-executable programs and modules, such as program instructions/modules corresponding to the image capturing method provided in the embodiments of the present application. The processor 910 executes software programs, instructions and modules stored in the storage apparatus 920 to perform various function applications and data processing of the electronic device, that is, to implement the image capturing method in the preceding method embodiments.

The storage apparatus 920 may include a program storage area and a data storage area, where the program storage area may store an operating system and an application program required by at least one function, and the data storage area may store the data created according to the use of the electronic device. Additionally, the storage apparatus 920 may include a high-speed random-access memory and may also include a non-volatile memory, such as at least one magnetic disk memory, a flash memory or another non-volatile solid-state memory. In some examples, the storage apparatus 920 may include memories, the memories are remotely disposed relative to the processor 910, and these remote memories may be connected to the device via a network. Examples of the preceding network include, but are not limited to, the Internet, an intranet, a local area network, a mobile communication network and a combination thereof.

The input apparatus 930 may be configured to receive inputted digital or character information and generate key signal input related to user settings and function control of the electronic device. The output apparatus 940 may include a display device such as a display screen.

When executed by the one or more processors 910, the one or more programs included in the above electronic device perform the operations below.

A predicted projection area position of a target object in a current captured image on an image sensor and at a new acquisition moment is determined, and estimated exposure brightness information of the target object in the predicted projection area position and at the new acquisition moment is determined. An exposure parameter of the target object in the predicted projection area position is adjusted according to a type of the target object and the estimated exposure brightness information when the new acquisition moment arrives. A new captured image is acquired at the new acquisition moment according to the adjusted exposure parameter, where both the new captured image and the current captured image include the target object.

When executed by the one or more processors 910, the one or more programs included in the above electronic device may also perform related operations in the image capturing method provided in any one of the embodiments of the present application.

An embodiment of the present application provides a computer-readable storage medium, the storage medium is configured to store a computer program, and the computer program, when executed by a processor, is used for performing an image capturing method. The method includes the steps below.

A predicted projection area position of a target object in a current captured image on an image sensor and at a new acquisition moment is determined, and estimated exposure brightness information of the target object in the predicted projection area position and at the new acquisition moment is determined. An exposure parameter of the target object in the predicted projection area position is adjusted according to a type of the target object and the estimated exposure brightness information when the new acquisition moment arrives. A new captured image is acquired at the new acquisition moment according to the adjusted exposure parameter, where both the new captured image and the current captured image include the target object.

Optionally, when executed by the processor, the program may also be used for performing the image capturing method provided in any one of the embodiments of the present application.

A computer storage medium in the embodiment of the present application may adopt any combination of one or more computer-readable media. The computer-readable media may be computer-readable signal media or computer-readable storage media. A computer-readable storage medium, for example, may be, but is not limited to, an electronic, magnetic, optical, electromagnetic, infrared or semiconductor system, apparatus or device or any combination thereof. Examples (a non-exhaustive list) of the computer-readable storage medium include an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device or any suitable combination thereof. The computer-readable storage medium may be any tangible medium including or storing a program. The program may be used by or used in conjunction with an instruction execution system, apparatus or device.

A computer-readable signal medium may include a data signal propagated in a baseband or as part of a carrier.

Computer-readable program codes are carried in the data signal. The data signal propagated in this manner may be in multiple forms and includes, but is not limited to, an electromagnetic signal, an optical signal or any suitable combination thereof. The computer-readable signal medium may also be any computer-readable medium except the computer-readable storage medium. The computer-readable medium may send, propagate or transmit a program used by or used in conjunction with an instruction execution system, apparatus or device.

Program codes included in computer-readable media may be transmitted by using any suitable medium, including, but not limited to, a wireless medium, a wired medium, an optical cable, a radio frequency (RF) and the like or any suitable combination thereof.

Computer program codes for performing the operations of the present application may be written in one or more programming languages or a combination thereof, the programming languages including object-oriented programming languages such as Java, Smalltalk and C++ and further including conventional procedural programming languages such as C programming language or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a local area network (LAN) or a wide area network (WAN) or may be connected to an external computer (for example, via the Internet provided by an Internet service provider).

In the description of the present application, the description of reference terms such as "one embodiment", "some embodiments", "an example", "a specific example" or "some examples" means that a feature, structure, material or characteristic described in conjunction with the embodiment or the example is included in at least one embodiment or example of the present application. In the specification, the illustrative description of the preceding terms does not necessarily refer to the same embodiment or example. Moreover, described features, structures, materials or characteristics may be combined in an appropriate manner in any one or more embodiments or examples.

What is claimed is:

1. An image capturing method, comprising:
   at a new acquisition moment, predicting a predicted projection area position of a target object in a current captured image on an image sensor and estimated exposure brightness information of the target object in the predicted projection area position;
   adjusting, according to a type of the target object and the estimated exposure brightness information, an exposure parameter of the target object in the predicted projection area position when the new acquisition moment arrives; and
   acquiring a new captured image at the new acquisition moment according to the adjusted exposure parameter, wherein both the new captured image and the current captured image comprise the target object;
   wherein predicting the estimated exposure brightness information of the target object in the predicted projection area position and at the new acquisition moment comprises:
   determining a current projection area position of the target object on the image sensor and at a current acquisition moment;
   at the current acquisition moment, determining first current exposure brightness information of the target object in the current projection area position and second current exposure brightness information of the target object in the predicted projection area position; and
   determining the estimated exposure brightness information according to the first current exposure brightness information and the second current exposure brightness information.

2. The method of claim 1, wherein
   predicting the predicted projection area position of the target object in the current captured image on the image sensor and at the new acquisition moment comprises: determining a current image position of the target object in the current captured image and at the current acquisition moment; predicting a motion of the target object according to the current image position and determining a predicted image position of the target object in the current captured image and at the new acquisition moment; and determining the predicted projection area position of the target object on the image sensor at the new acquisition moment according to the predicted image position; and
   determining the current projection area position of the target object on the image sensor and at the current acquisition moment comprises: determining the current projection area position of the target object on the image sensor and at the current acquisition moment according to the current image position.

3. The method of claim 1, wherein adjusting, according to the type of the target object and the estimated exposure brightness information, the exposure parameter of the target object in the predicted projection area position when the new acquisition moment arrives comprises:
   determining target exposure brightness information associated with the type of the target object; and
   adjusting, according to the target exposure brightness information and the estimated exposure brightness information, the exposure parameter of the target object in the predicted projection area position when the new acquisition moment arrives.

4. The method of claim 3, wherein adjusting, according to the target exposure brightness information and the estimated exposure brightness information, the exposure parameter of the target object in the predicted projection area position when the new acquisition moment arrives comprises:
   determining brightness difference information between the target exposure brightness information and the estimated exposure brightness information; and
   in response to detecting that the brightness difference information does not satisfy preset difference information, adjusting, according to the brightness difference information, the exposure parameter of the target object in the predicted projection area position when the new acquisition moment arrives.

5. The method of claim 1, further comprising:
   determining at least one of an image quality or a feature similarity of the target object comprised in the new captured image; and
   adjusting an image parameter of the new captured image according to at least one of the determined image quality or the determined feature similarity to obtain an adjusted new captured image.

6. An image capturing apparatus, comprising:
at least one processor; and
a storage apparatus configured to store at least one program;
wherein the at least one program is executed by the at least one processor to cause the at least one processor to implement operations in an exposure brightness determination module, an exposure parameter adjustment module and an image exposure capture module; wherein
the exposure brightness determination module is configured to at a new acquisition moment, predict a predicted projection area position of a target object in a current captured image on an image sensor and estimated exposure brightness information of the target object in the predicted projection area position;
the exposure parameter adjustment module is configured to adjust, according to a type of the target object and the estimated exposure brightness information, an exposure parameter of the target object in the predicted projection area position when the new acquisition moment arrives; and
the image exposure capture module is configured to acquire a new captured image at the new acquisition moment according to the adjusted exposure parameter, wherein both the new captured image and the current captured image comprise the target object;
wherein the exposure brightness determination module is configured to:
determine a current projection area position of the target object on the image sensor and at a current acquisition moment;
at the current acquisition moment, determine first current exposure brightness information of the target object in the current projection area position and second current exposure brightness information of the target object in the predicted projection area position; and
determine the estimated exposure brightness information according to the first current exposure brightness information and the second current exposure brightness information.

7. A non-transitory computer-readable storage medium, wherein the storage medium is configured to store a computer program, and the computer program, when executed by a processor, implements:
at a new acquisition moment, predicting a predicted projection area position of a target object in a current captured image on an image sensor and estimated exposure brightness information of the target object in the predicted projection area position;
adjusting, according to a type of the target object and the estimated exposure brightness information, an exposure parameter of the target object in the predicted projection area position when the new acquisition moment arrives; and
acquiring a new captured image at the new acquisition moment according to the adjusted exposure parameter, wherein both the new captured image and the current captured image comprise the target object;
wherein predicting the estimated exposure brightness information of the target object in the predicted projection area position and at the new acquisition moment comprises:
determining a current projection area position of the target object on the image sensor and at a current acquisition moment;
at the current acquisition moment, determining first current exposure brightness information of the target object in the current projection area position and second current exposure brightness information of the target object in the predicted projection area position; and
determining the estimated exposure brightness information according to the first current exposure brightness information and the second current exposure brightness information.

8. The apparatus of claim 6, wherein
the exposure brightness determination module is configured to:
determine a current image position of the target object in the current captured image and at the current acquisition moment; predict a motion of the target object according to the current image position and determine a predicted image position of the target object in the current captured image and at the new acquisition moment; and determine the predicted projection area position of the target object on the image sensor at the new acquisition moment according to the predicted image position; and
the exposure brightness determination module is further configured to: determine the current projection area position of the target object on the image sensor and at the current acquisition moment according to the current image position.

9. The apparatus of claim 6, wherein the exposure parameter adjustment module comprises:
a target brightness determination unit configured to determine target exposure brightness information associated with the type of the target object; and
an exposure parameter adjustment unit configured to adjust, according to the target exposure brightness information and the estimated exposure brightness information, the exposure parameter of the target object in the predicted projection area position when the new acquisition moment arrives.

10. The apparatus of claim 9, wherein the exposure parameter adjustment unit is configured to:
determine brightness difference information between the target exposure brightness information and the estimated exposure brightness information; and
in response to detecting that the brightness difference information does not satisfy preset difference information, adjust, according to the brightness difference information, the exposure parameter of the target object in the predicted projection area position when the new acquisition moment arrives.

11. The apparatus of claim 6, further comprising:
a captured image analysis module configured to determine at least one of an image quality or a feature similarity of the target object comprised in the new captured image; and
a captured image processing module configured to adjust an image parameter of the new captured image according to at least one of the determined image quality or the determined feature similarity to obtain an adjusted new captured image.

12. The non-transitory computer-readable storage medium of claim 7, wherein
predicting the predicted projection area position of the target object in the current captured image on the image sensor and at the new acquisition moment comprises:
determining a current image position of the target object in the current captured image and at the current acquisition moment; predicting a motion of the target object according to the current image position and determining a predicted image position of the target object in the current captured image and at the new acquisition moment; and determining the predicted projection area position of the target object on the image sensor at the new acquisition moment according to the predicted image position; and determining the current projection area position of the target object on the image sensor and at the current acquisition moment comprises: determining the current projection area position of the target object on the image sensor and at the current acquisition moment according to the current image position.

13. The non-transitory computer-readable storage medium of claim 7, wherein adjusting, according to the type of the target object and the estimated exposure brightness information, the exposure parameter of the target object in the predicted projection area position when the new acquisition moment arrives comprises:

determining target exposure brightness information associated with the type of the target object; and adjusting, according to the target exposure brightness information and the estimated exposure brightness information, the exposure parameter of the target object in the predicted projection area position when the new acquisition moment arrives.

14. The non-transitory computer-readable storage medium of claim 13, wherein adjusting, according to the target exposure brightness information and the estimated exposure brightness information, the exposure parameter of the target object in the predicted projection area position when the new acquisition moment arrives comprises:

determining brightness difference information between the target exposure brightness information and the estimated exposure brightness information; and in response to detecting that the brightness difference information does not satisfy preset difference information, adjusting, according to the brightness difference information, the exposure parameter of the target object in the predicted projection area position when the new acquisition moment arrives.

15. The non-transitory computer-readable storage medium of claim 7, wherein the computer program further implements:

determining at least one of an image quality or a feature similarity of the target object comprised in the new captured image; and adjusting an image parameter of the new captured image according to at least one of the determined image quality or the determined feature similarity to obtain an adjusted new captured image.

* * * * *